United States Patent
Duan et al.

(10) Patent No.: US 10,468,159 B1
(45) Date of Patent: Nov. 5, 2019

(54) POWER CABLE WITH LAMINATED STEEL AND POLYMER ARMOR

(71) Applicant: Baker Hughes Oilfield Operations LLC, Houston, TX (US)

(72) Inventors: Ping Duan, Houston, TX (US); Anil Sadana, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/392,075

(22) Filed: Apr. 23, 2019

Related U.S. Application Data

(60) Provisional application No. 62/661,709, filed on Apr. 24, 2018.

(51) Int. Cl.
   - H01B 9/02 (2006.01)
   - H01B 13/22 (2006.01)
   - H02G 9/00 (2006.01)
   - H01B 9/00 (2006.01)
   - H01B 3/44 (2006.01)

(52) U.S. Cl.
   CPC .............. H01B 9/02 (2013.01); H01B 3/441 (2013.01); H01B 3/445 (2013.01); H01B 9/006 (2013.01); H01B 13/22 (2013.01); H02G 9/00 (2013.01)

(58) Field of Classification Search
   CPC .......... H01B 9/02; H01B 3/441; H01B 3/445; H01B 9/006; H01B 13/22; H02G 9/00
   USPC ....................................................... 174/107
   See application file for complete search history.

(56) References Cited

U.S. PATENT DOCUMENTS

| | | | | |
|---|---|---|---|---|
| 3,823,747 A | * | 7/1974 | Dembiak | F16L 9/17 138/141 |
| 4,780,574 A | * | 10/1988 | Neuroth | H01B 7/046 156/52 |
| 5,281,488 A | * | 1/1994 | Poulsen | H01B 7/0018 174/117 FF |
| 5,414,217 A | * | 5/1995 | Neuroth | H01B 7/2806 174/102 R |
| 5,431,759 A | | 7/1995 | Neuroth | |
| 6,080,935 A | * | 6/2000 | Lanoue | H01F 27/323 174/117 F |
| 6,397,945 B1 | * | 6/2002 | Manke | H01B 7/046 166/105 |
| 6,555,752 B2 | | 4/2003 | Dalrymple et al. | |
| 6,906,264 B1 | * | 6/2005 | Grant, Jr. | H01B 7/366 174/102 D |

(Continued)

*Primary Examiner* — Timothy J Thompson
*Assistant Examiner* — Michael F McAllister
(74) *Attorney, Agent, or Firm* — Bracewell LLP; James E. Bradley

(57) ABSTRACT

A power cable for an electrical submersible well pump has at least one insulated conductor and an armor strip wrapped in helical turns around the conductor. The armor strip has a steel layer and a first polymer layer bonded to a first side of the steel layer. Each of the helical turns of the armor strip overlaps with another of the helical turns, causing the first polymer layer of each of the helical turns to form a seal with of a next one of the helical turns. A second polymer layer may be bonded to a second side of the steel layer. The second polymer layer of each of the helical turns overlies in sealing contact with the first polymer layer of the next one of the helical turns.

18 Claims, 3 Drawing Sheets

(56) References Cited

U.S. PATENT DOCUMENTS

| | | | | |
|---|---|---|---|---|
| 6,976,510 | B2* | 12/2005 | Campagna | F16L 9/147 |
| | | | | 138/137 |
| 8,916,775 | B2* | 12/2014 | Tamaki | H01B 11/1025 |
| | | | | 174/102 R |
| 8,993,883 | B2* | 3/2015 | Kumakura | H01B 11/20 |
| | | | | 174/109 |
| 9,303,798 | B2* | 4/2016 | Sheldrake | F16L 11/16 |
| 9,440,273 | B2* | 9/2016 | McMillen | B21C 37/121 |
| 9,472,320 | B2* | 10/2016 | Lundgren | H01B 7/20 |
| 2004/0055772 | A1* | 3/2004 | Tsutsui | H01B 11/1016 |
| | | | | 174/36 |
| 2009/0250239 | A1* | 10/2009 | Picard | H01B 9/028 |
| | | | | 174/109 |
| 2010/0147505 | A1 | 6/2010 | Manke et al. | |
| 2011/0011613 | A1* | 1/2011 | Brown, Jr. | H02G 3/0468 |
| | | | | 174/68.3 |
| 2011/0011614 | A1* | 1/2011 | Brown, Jr. | H01B 7/2806 |
| | | | | 174/107 |
| 2013/0306348 | A1 | 11/2013 | Holzmueller et al. | |
| 2016/0225494 | A1* | 8/2016 | Harrington | H01B 13/26 |
| 2017/0365375 | A1* | 12/2017 | Holzmueller | H01B 7/046 |

* cited by examiner

POWER CABLE WITH LAMINATED STEEL AND POLYMER ARMOR

CROSS-REFERENCE TO RELATED APPLICATION

This application claims priority to provisional application 62/661,709, filed Apr. 24, 2018.

FIELD OF THE DISCLOSURE

This disclosure relates in general to power cables for electrical submersible pumps (ESP) for wells and in particular to having an outer armor strip wrapped helically around the power cable, the outer armor strip having a steel layer sandwiched between inner and outer polymer layers that are bonded to the steel layer.

BACKGROUND

Electrical submersible pumps (ESP) are often used to pump fluids from hydrocarbon wells. An ESP normally includes a motor, a pump, and a pressure equalizer or seal section that reduces a pressure differential between well fluid on the exterior and dielectric lubricant in the motor interior. A power cable extends from the wellhead to the motor to supply power. The power cable may be strapped to production tubing that supports the ESP, or it may be located within coiled tubing that supports the ESP.

A typical power cable has three copper conductors, each conductor surrounded by one or more layers of insulation, including heat resistant EPDM insulation. A jacket of oil resistant EPDM may encase the three conductors. An armor of galvanized or stainless steel formed in a strip wraps helically around the jacket.

If the power cable is to be used in wells that produce hydrogen sulfide gas, each conductor may have a sheath of lead. Each lead sheath serves as a barrier layer to prevent hydrogen sulfide gas from permeating under pressure through the insulation layers into contact with the copper conductors. If the gas reaches the copper conductors, it can corrode them. Also, when retrieving the ESP, if hydrogen sulfide gas has permeated through the insulation layers, the rapid decrease in well pressure can cause explosive decompression damage. While lead sheaths work well, they add weight to the power cable and cause environmental concerns during manufacturing.

SUMMARY

A power cable for an electrical submersible well pump has at least one insulated conductor. An armor strip is wrapped in helical turns around the insulated conductor. The armor strip has a steel layer and a first polymer layer bonded to a first side of the steel layer. Each of the helical turns of the armor strip overlaps with another of the helical turns, causing the first polymer layer of each of the helical turns to form a seal with of a next one of the helical turns.

In one embodiment, a layer of adhesive that bonds the first polymer layer to the first side of the steel layer.

A second polymer layer may be bonded to a second side of the steel layer. The second polymer layer of each of the helical turns overlies in sealing contact with the first polymer layer of the next one of the helical turns. A second adhesive layer may be used to bond the second polymer layer to the second side of the steel layer.

In the embodiments shown, the power cable has three insulated conductors. Each of the helical turns of the armor strip wraps around all three of the insulated conductors. An elastomeric jacket encases the three insulated conductors. Each of the helical turns of the armor strip wraps around the jacket.

The polymer layer or layers may comprise a fluoropolymer.

In one embodiment, the steel layer has a thickness in the range from 0.015 inch to 0.034 inch, and the thickness of the polymer layer is in the range from 0.010 inch to 0.025 inch.

If only one polymer layer is employed, the polymer layer of each of the helical turns is in contact with and forms a seal with the steel layer of a next one of the helical turns.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
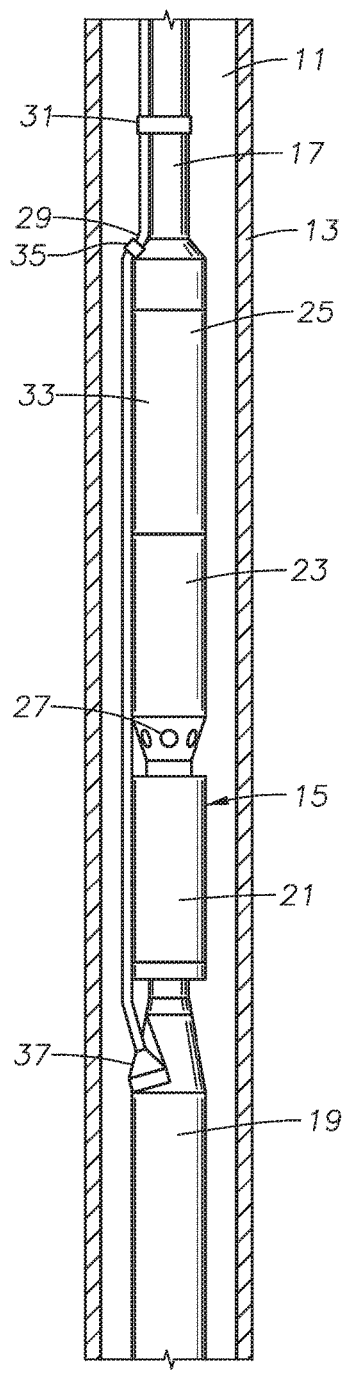
FIG. 1 is a schematic view of an ESP installation with a power cable in accordance with this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. An electrical submersible pump ("ESP") 15 is illustrated as being supported on production tubing 17 extending into well 11. Alternately, ESP 15 could be supported by other structure, such as coiled tubing. Although shown installed vertically, ESP 15 could be located within an inclined or horizontal section of well 11. The terms "upper", "lower" and the like are used herein only for convenience, because ESP 15 can be operated in inclined or horizontal sections of a well.

ESP 15 has several modules, including a motor 19, normally a three-phase electrical motor. A motor protector or seal section 21 connects to motor 19 and has flexible components, such as a bladder, for reducing a pressure differential between lubricant in motor 19 and the hydrostatic pressure of well fluid. Seal section 21 may be mounted to an upper end of motor 19 or alternately to a lower end. An optional gas separator 23 connects to the upper end of seal section 21 in this example.

A pump 25 connects to gas separator 23 if one is employed; if a gas separator is not used, pump 25 may connect to seal section 21, as shown, or to motor 19. Pump 25 has a well fluid intake 27 that will be in gas separator 23 if one is used, and if not, at a base of pump 25. Pump 25 is normally a rotary pump, such as a centrifugal or progressing cavity pump, but it could be a reciprocating pump. The connections between the modules of ESP 15 are shown as bolted flanges, but they could be threaded connections.

A power cable 29 extends from a wellhead (not shown) alongside tubing 17 for supplying power to motor 19. Spaced apart clamps 31 (only one shown) secure power cable 29 to production tubing 17. A motor lead 33, which may be considered to be a lower part of power cable 29, connects to a lower end of power cable 29 by a splice 35 in this example. Motor lead 33 extends alongside ESP 15 and has an electrical connector 37 on its lower end that secures to a receptacle at the upper end of motor 19. Splice 35 is illustrated at the upper end of pump 25, but it could be a considerable distance above pump 25. Motor lead 33 often has a length from 80 to 90 feet. If the ESP is suspended on coiled tubing, the power cable would extend through the coiled tubing, and the motor would normally be at the upper end of the ESP.

Figure 2:
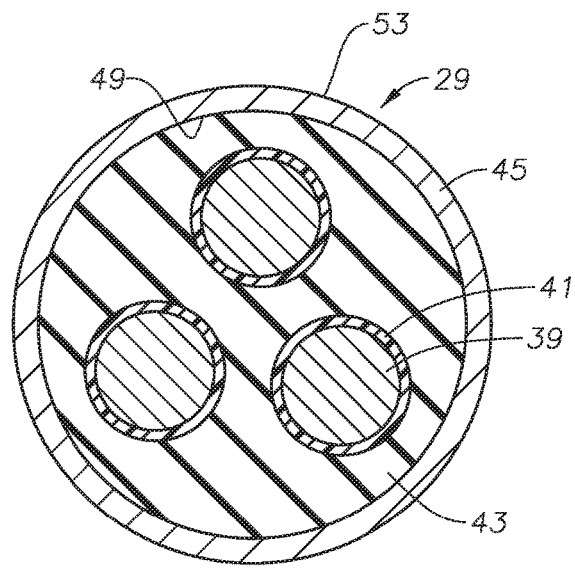
FIG. 2 is a transverse sectional view of the power cable of FIG. 1.

Referring to FIG. 2, in this example, power cable 29 has a circular shape in transverse cross section. Power cable 29 has three copper conductors 39 for supplying electrical power to motor 19 (FIG. 1). Additional wires could also be located in power cable 29 for conveying signals to and from sensors of ESP 15. Further, capillary tubes for conveying fluid could be within power cable 29.

Conductors 39 are spaced 120 degrees apart from each other. If power cable 29 is flat, such as in motor lead 33, insulated conductors 39 would be side by side, with their centerlines in a single plane. Each conductor 39 has one or more insulation layers 41, which could be different conventional materials, including heat resistant EPDM (ethylene propylene diene monomer) rubber. In this example, a jacket 43 is extruded over the three insulated conductors 29. Jacket 43 could be of different conventional materials, such as an oil resistant EPDM.

Figure 3:
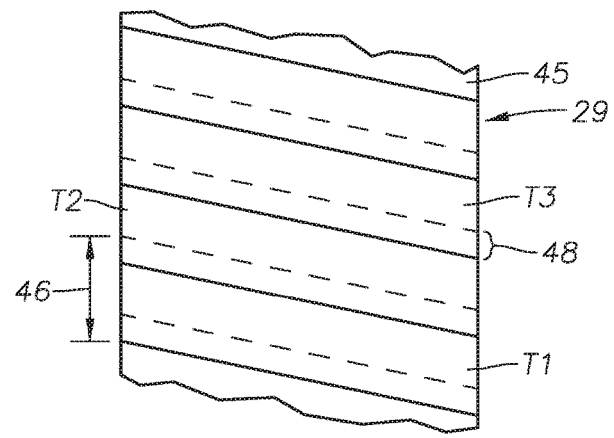
FIG. 3 is a side view of a portion of the power cable of FIG. 2, illustrating an outer armor strip wrapped helically around an elastomeric jacket of the power cable.

An outer armor strip 45 wraps tightly around the cylindrical exterior of jacket 43. As shown in FIG. 3, outer armor strip 45 wraps helically around jacket 43 (FIG. 2). Each turn T1, T2, T3 overlaps with the turn previously wrapped around jacket 43, creating an overlapped area 48 at each turn, as indicated by the dotted lines in FIG. 3. Turn T1 overlaps with turn T2, and turn T2 overlaps with turn T3. The width of overlapped area 48 can vary, but may be about 40% of the width 46 of outer armor strip 45. A typical width 46 is constant and about ½ inch.

Figure 4:
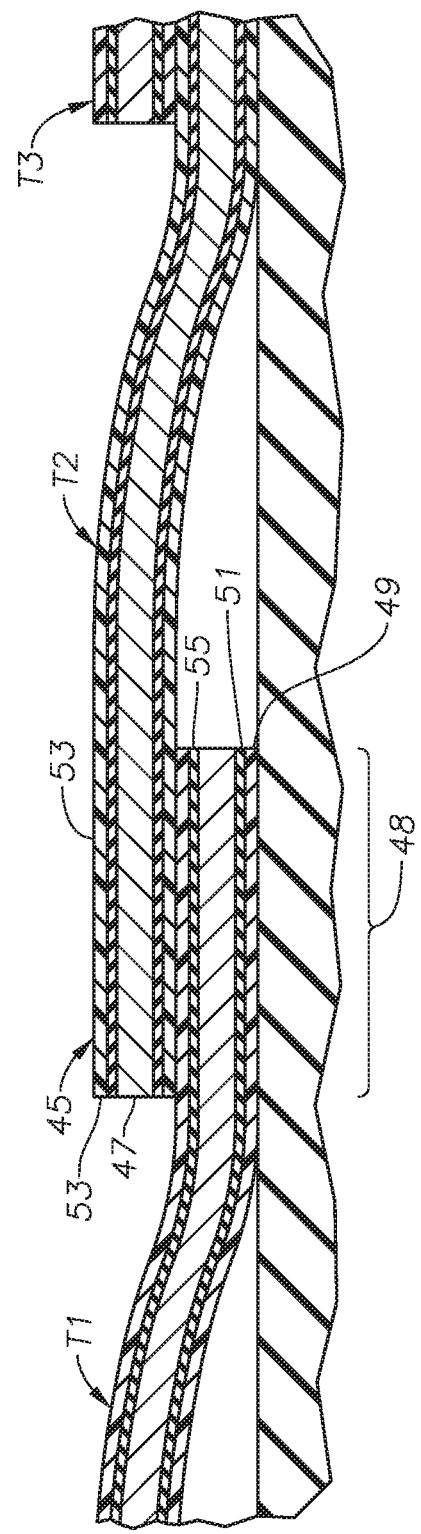
FIG. 4 is an enlarged sectional view of an overlapping portion of the outer armor strip.

FIG. 4 schematically illustrates overlapped area 48 between turn T1 and turn T2. The thickness of outer armor strip 45 is greatly exaggerated. Prior to wrapping outer armor strip 45 around jacket 43, outer armor strip 45 may be flat when viewed in a transverse sectional plane, having no outward or inward turned side edges or lips. As outer armor strip 45 wraps around jacket 43, it will deflect and curve because of overlapped area 48 of each turn.

Outer armor strip 45 includes a steel layer 47, typically galvanized or stainless steel. An inner polymer layer 49 is bonded to the inner side of steel layer 47, such as by an inner adhesive layer 51. An outer polymer layer 53 is bonded to the outer side of steel layer 47, such as by an outer adhesive layer 55. Inner and outer polymer layers 49, 53 may be the same type of material and are preferably fluoropolymers. Examples of suitable fluoropolymers include: PTFE (polytetrafluoroethylene); PFA (perfluoroalkoxy alkane); and FEP (fluorinated ethylene propylene).

Polymer layers 49, 53 have the same widths as the width of steel layer 47. The thickness of steel layer 47 may be in the range from 0.015 inch to 0.034 inch, which is typically the thickness of conventional outer armor strips. The thickness of each polymer layer 49, 51 may be in the range from 0.010 inch to 0.025 inch.

When turn T2 wraps over turn T1, inner polymer layer 49 of turn T2 will be in tight flush contact with outer polymer layer 53 of turn T1 in the overlapped area 48. In part of the non-overlapped portion, inner polymer layer 49 of turn T2 will be in contact with elastomeric jacket 43. The tight contact between inner and outer polymer layers 49, 53 in the overlapped area 48 forms a seal that prevents the ingression of well fluid, including hydrogen sulfide gas. Hydrogen sulfide gas can permeate through inner and outer polymer layers 49, 53, but not through steel layer 47. Optionally, inner and outer polymer layers 49, 53 could have adhesive on their outer surfaces that would cause bonding to each other in the overlapped areas. The gasket formed by inner and outer polymer layers 49, 53 may eliminate the need for lead sheaths around insulated conductors 39 (FIG. 2).

Figure 5:
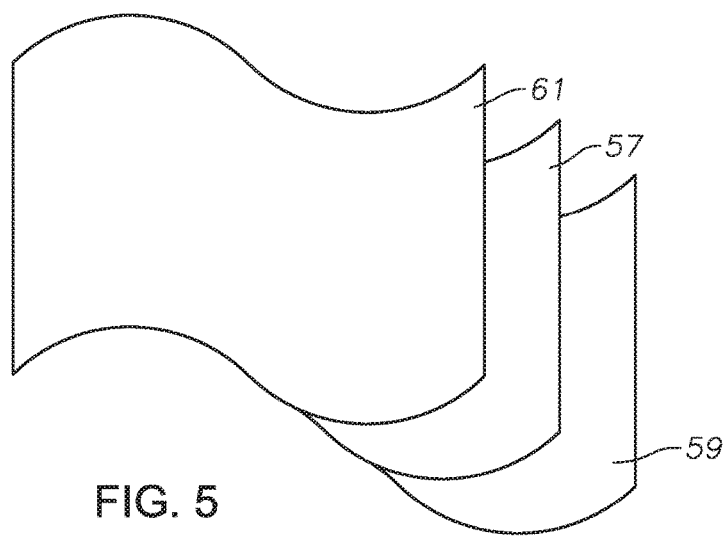
FIG. 5 is an schematic view illustrating steel and polymer sheets used to manufacture the outer armor strip.
Figure 6:
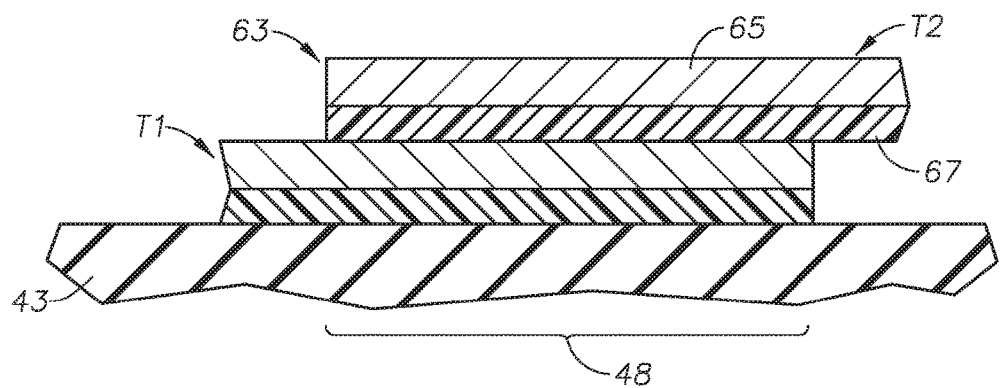
FIG. 6 is an enlarged sectional view of an overlapping portion of an alternate embodiment of an outer armor strip.

FIG. 5 illustrates one example of manufacturing outer armor strip 45. First, one side of each fluoropolymer sheet 59, 61 is chemically etched so that it is bondable to a steel sheet 57 by the use of an adhesive. Then steel sheet 57 is sandwiched and laminated between the two adhesive-coated fluoropolymer sheets 59, 61. The composite sheet is then sliced to the desired width for armor strip 45. An exterior layer (not shown) of adhesive could be applied to the exterior side, which is the side not in contact with steel sheet 57, of one or both of the fluoropolymer sheets 59, 61.

FIG. 7 schematically illustrates an alternate embodiment of an outer armor strip 63. Steel layer 65 and polymer layer 67 may be the same materials as in the first embodiment, and polymer layer 67 may be bonded to steel layer 65 in the same manner as in the first embodiment. In the second embodiment, there is only one polymer layer 67 bonded to steel layer 65. Polymer layer 67 is illustrated as being on the inner side of steel layer 47, but it could be on the outer side. Wrapping outer armor strip 63 in a turn T1 places polymer layer 67 in tight sealing contact with jacket 43 in overlapped area 48. The second turn T2 places polymer layer 67 of turn T2 in tight sealing contact with the outer side of steel layer 65 of turn T1. The contact of polymer layer 67 of turn T2 with steel layer 65 of turn T1 creates a seal to prevent the ingression of well fluid into contact with jacket 43.

While this disclosure has been shown in only two of its forms, it should be apparent to those skilled in the art that it is not so limited, but is susceptible to various changes without departing from the scope of the claims.

The invention claimed is:

1. A power cable for an electrical submersible well pump, comprising:
   at least one insulated conductor;
   an armor strip wrapped in helical turns around the at least one insulated conductor;
   the armor strip having a steel layer and a first polymer layer bonded to a first side of the steel layer; and wherein
   each of the helical turns of the armor strip overlaps with another of the helical turns, causing the first polymer layer of each of the helical turns to form a seal with of a next one of the helical turns.

2. The power cable according to claim 1, further comprising:
   a layer of adhesive that bonds the first polymer layer to the first side of the steel layer.

3. The power cable according to claim 1, further comprising:
   a second polymer layer bonded to a second side of the steel layer; and wherein
   the second polymer layer of each of the helical turns overlies in sealing contact with the first polymer layer of the next one of the helical turns.

4. The power cable according to claim 3, further comprising:
   a first adhesive layer that bonds the first polymer layer to the first side of the steel layer; and
   a second adhesive layer that bonds the second polymer layer to the second side of the steel layer.

5. The power cable according to claim 1, wherein:
   said at least one insulated conductor comprises three insulated conductors; and
   each of the helical turns of the armor strip wraps around all three of the insulated conductors.

6. The power cable according to claim 5, further comprising;
   an elastomeric jacket encasing the three insulated conductors; and wherein
   each of the helical turns of the armor strip wraps around the jacket.

7. The power cable according to claim 1, wherein the first polymer layer comprises a fluoropolymer.

8. The power cable according to claim 1, wherein the steel layer has a thickness in the range from 0.015 inch to 0.034 inch, and the thickness of the polymer layer is in the range from 0.010 inch to 0.025 inch.

9. The power cable according to claim 1, wherein the polymer layer of each of the helical turns is in contact with and forms a seal with the steel layer of a next one of the helical turns.

10. A power cable for an electrical submersible well pump, comprising:
    three insulated conductors embedded within an elastomeric jacket;
    an armor strip wrapped in overlapping helical turns around the elastomeric jacket;
    the armor strip having a steel layer with a first polymer layer bonded to a first side of the steel layer; and wherein
    in an overlapped portion of each of the helical turns, the first polymer layer is in sealing contact with a next one of the helical turns to reduce ingression of well fluid into contact with the elastomeric jacket.

11. The power cable according to claim 10, wherein the first polymer layer is in sealing contact with the steel layer in the overlapped portion.

12. The power cable according to claim 10, further comprising:
    a second polymer layer bonded to a second side of the steel layer; and wherein:
    the first polymer layer is in sealing contact with the second polymer layer in the overlapped portion.

13. The power cable according to claim 12, wherein the first and second polymer layers each comprise a fluoropolymer.

14. The power cable according to claim 10, wherein the first polymer layer comprises a fluoropolymer.

15. A power cable for an electrical submersible well pump, comprising:
    three insulated conductors;
    an elastomeric jacket surrounding the three insulated conductors;
    an armor strip wrapped in helical turns around the elastomeric jacket, defining an overlapped portion and a non-overlapped portion with of each of the helical turns;
    the armor strip having a steel layer with a first polymer layer bonded to a first side of the steel layer and a second polymer layer bonded to a second side of the steel layer; and wherein
    in the overlapped portion of each of the helical turns, the second polymer layer is in sealing contact with the first polymer layer of a next one of the helical turns to reduce ingression of well fluid into contact with the elastomeric jacket.

16. The power cable according to claim 15, wherein each of the first and second polymer layers comprises a fluoropolymer layer.

17. The power cable according to claim 15, wherein the steel layer has a thickness in the range from 0.015 inch to 0.034 inch, and the thickness of each of the polymer layers is in the range from 0.010 inch to 0.025 inch.

18. The power cable according to claim 15, further comprising:
    a first adhesive layer that bonds the first polymer layer to the first side of the steel layer; and
    a second adhesive layer that bonds the second polymer layer to the second side of the steel layer.

* * * * *